(12) United States Patent
Simoes et al.

(10) Patent No.: US 8,767,945 B2
(45) Date of Patent: Jul. 1, 2014

(54) IM TO PHONE ESCALATION FOR CUSTOMER SUPPORT

(75) Inventors: Renato Simoes, Fortaleza-CE (BR); Brian Hillis, Centennial, CO (US); Roderick Averill, Centennial, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/430,021

(22) Filed: Mar. 26, 2012

(65) Prior Publication Data

US 2013/0251136 A1   Sep. 26, 2013

(51) Int. Cl.
*H04M 3/00* (2006.01)
*H04M 5/00* (2006.01)

(52) U.S. Cl.
USPC ............. 379/265.09; 379/265.02; 709/204; 709/209; 709/229

(58) Field of Classification Search
USPC ............. 379/265.01–265.14, 266.01–266.09, 379/88.17–88.22; 709/203, 209, 229, 204
See application file for complete search history.

(56) References Cited

U.S. PATENT DOCUMENTS

| | | | |
|---|---|---|---|
| 6,771,760 B1* | 8/2004 | Vortman et al. | 379/209.01 |
| 2003/0154293 A1* | 8/2003 | Zmolek | 709/228 |
| 2006/0019655 A1* | 1/2006 | Peacock | 455/426.1 |
| 2006/0075055 A1* | 4/2006 | Littlefield | 709/206 |
| 2007/0033259 A1* | 2/2007 | Wies et al. | 709/206 |
| 2008/0043986 A1* | 2/2008 | Darby | 379/265.09 |
| 2008/0059570 A1* | 3/2008 | Bill | 709/203 |
| 2009/0077176 A1* | 3/2009 | Shae et al. | 709/204 |
| 2009/0086957 A1 | 4/2009 | Kelley et al. | |
| 2011/0110507 A1* | 5/2011 | Spiegel | 379/131 |

* cited by examiner

*Primary Examiner* — Oleg Asanbayev
(74) *Attorney, Agent, or Firm* — Maldjian Law Group LLC; John Maldjian; Alexander D. Walter

(57) ABSTRACT

System and method to change a mode of communication used by an agent at a contact center for customer service, the method including: receiving, from a customer, a customer contact via a first mode of communication; establishing a first communication link, using the first mode of communication, between the customer and the agent; communicating by use of the first mode of communication between the customer and the agent; receiving an instruction, via an instant message, to change the mode of communication to a second mode of customer service; interpreting, by the contact center, the instruction from the agent; establishing a second communication link, using the second mode of communication, between the customer and the agent; and communicating by use of the second mode of communication between the customer and the agent.

14 Claims, 5 Drawing Sheets

300

IM TO PHONE ESCALATION FOR CUSTOMER SUPPORT

BACKGROUND

1. Field of the Invention

Embodiments of the present invention generally relate to contact centers and a control of a contact environment between a customer or a potential customer (generically, "customer") and a service agent, and, in particular, to a system and method for escalating and/or de-escalating a mode of support by the service agent during a customer contact with a contact center.

2. Description of Related Art

Call centers are commonly used by service providers or manufacturers (collectively, "vendors") to provide customer support. Customers requesting customer support may contact the call center by telephone. As additional methods of communication between agent and customer have been developed such as, but not limited to, e-mail, instant messaging, web chat, and so forth, call centers have evolved into contact centers in order to handle communication by a variety of methods, i.e., beyond telephone calls. An instance of a customer contacting a contact center by any of these methods will be referred to herein as a customer contact. In contact centers, quickly finding and assigning a well-qualified service agent to service and fulfill a customer's need is important in providing improved customer satisfaction.

Typically, a contact center has the ability to handle a considerable volume of calls, providing functions such as routing calls to agents, logging calls, recording calls, and so forth. Contact centers are used by many mail-order catalog organizations, telemarketing companies, computer product help desks, government agencies, and large enterprises.

Known systems and methods for handling a customer contact in a contact center include providing choices to the customer prior to connecting with a service agent or after completing a call with the service agent, but these choices are generally limited in what is allowed. Multiple customer contacts may be needed to answer an inquiry or to resolve a problem, leading to inefficiencies and increased costs. The customer's perception may negatively affect their satisfaction with the customer contact and with the vendor.

Therefore, a need exists to provide more flexible communication methods during a customer contact between a customer and service agent, in order to provide a closer and more loyal customer relationship, and ultimately improved customer satisfaction.

SUMMARY

Embodiments of the present invention generally relate to a system and method for escalating and/or de-escalating a mode of support between a customer and a service agent, and in particular to a system and method for escalating, by the service agent, an IM chat support mode to a telephone support mode during a customer contact with a contact center.

In one embodiment, a method to change a mode of communication used by an agent at a contact center for customer service includes: receiving, from a customer, a customer contact via a first mode of communication; establishing a first communication link, using the first mode of communication, between the customer and the agent; communicating by use of the first mode of communication between the customer and the agent; receiving an instruction, via an instant message, to change the mode of communication to a second mode of customer service; interpreting, by the contact center, the instruction from the agent; establishing a second communication link, using the second mode of communication, between the customer and the agent; and communicating by use of the second mode of communication between the customer and the agent.

In one embodiment, a system to change a mode of communication used by an agent at a contact center for customer service includes: a first communication interface configured to receive, from a customer, a customer contact via a first mode of communication; a first communication link, using the first mode of communication, between the customer and the agent; a receiver configured to receive an instruction, via an instant message, to change the mode of communication to a second mode of customer service; a contact center module configured to interpret the instruction from the agent; and a second communication link, using the second mode of communication, between the customer and the agent, wherein the second communication link is activated in response to the instruction from the agent.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

DETAILED DESCRIPTION

Figure 1:
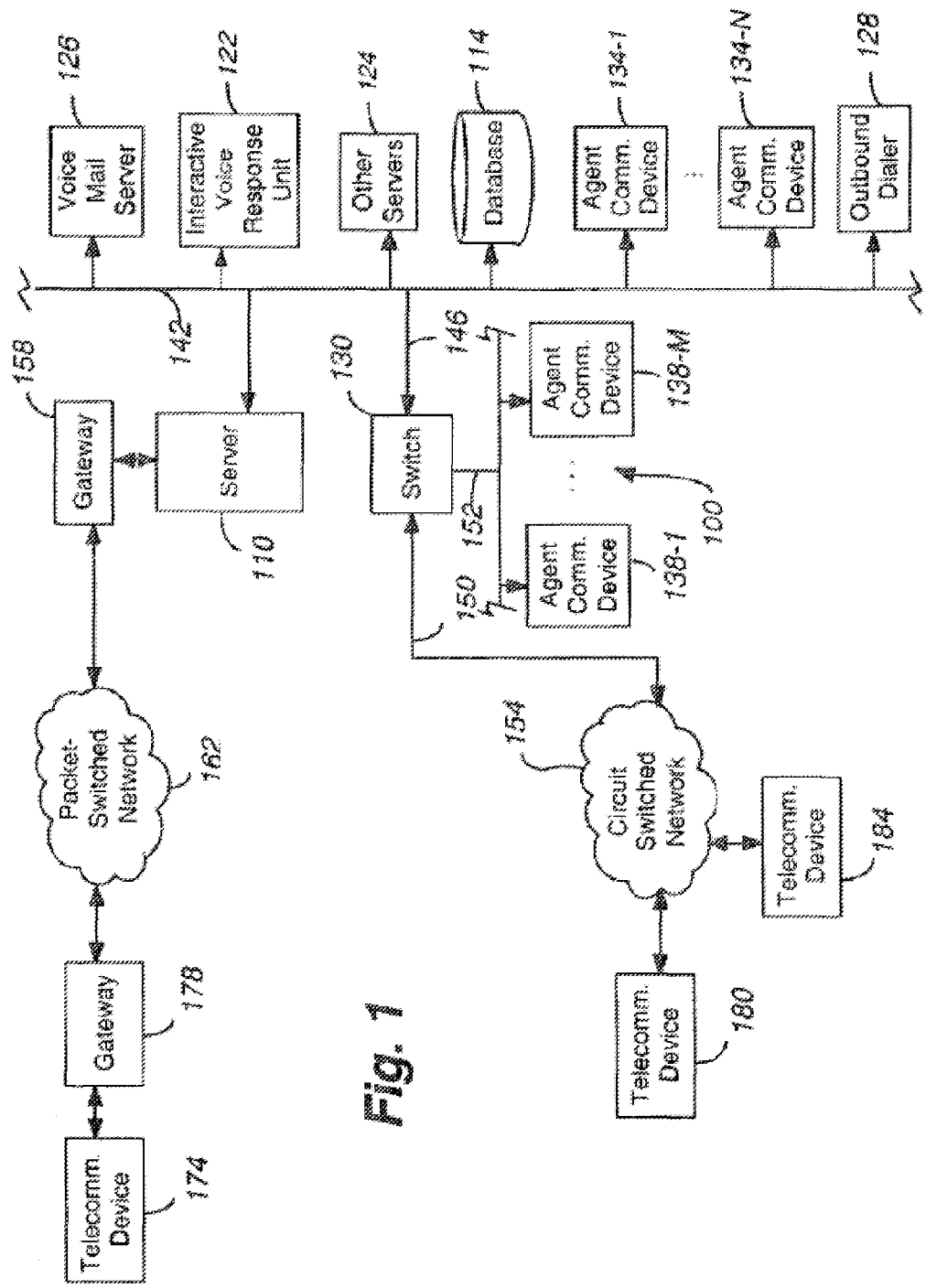
FIG. 1 is a block diagram depicting a contact center in accordance with an embodiment of the present invention.

Embodiments of the present invention generally relate to a system and method for changing a level of customer support between a customer and a service agent. More specifically, embodiments of the present invention relate to a system and method for escalating or de-escalating the communication methods used during a customer contact session with a contact center.

Communication between a customer and a contact center, in particular with a service agent at the contact center, ordinarily can be accomplished by one or more modes of communication. The modes of communication may vary in characteristics like the bandwidth requirements, the latency of the support (i.e., how close to real-time, immediacy, responsiveness, etc.), the level of participation by the agent, usage of other system resources, and so forth. For example, email support uses relatively little bandwidth and there may be a moderately high tolerance for latency. A chat mode also uses relatively little bandwidth, but there may be less tolerance for latency. A service agent may be able to participate simultaneously in more than one chat and/or email modes communication session involving respective customers. In contrast, a phone call uses relatively more bandwidth, and a video call even more bandwidth, and the service agent is able to participate in only one such phone or video communication session at a time. The various modes of communication may be viewed as being ranked in a hierarchy according to the level of resources each communication mode requires in order to be used. Switching from a less resource-intensive communication mode to a more resource-intensive communication mode may be considered an escalation of the mode of communication.

Conversely, switching from a more resource-intensive communication mode to a less resource-intensive communication mode may be considered a de-escalation of the mode of communication. De-escalation may occur, for instance, if a customer contact had been previously escalated from a chat mode to a phone call, and then during the same customer contact the service agent determines that any remaining support to the customer during the present customer contact can be handled by a less resource-intensive method such as by instant messaging.

Embodiments in accordance with the present invention provide solutions based on a standard protocol (e.g., SIP, H.323, etc.) for providing IM to voice and/or video call escalation, with consistent reporting, leveraging existing call manager ("CM") functionality (e.g., support of phantom calls, delivery of User to User Information ("UUI") to H.323 agent phones, providing a pop-up of an agent browser, etc.), which minimizes risks and/or changes. Embodiments in accordance with the present invention furthermore provide improved flexibility by use of a plug-N-play architecture. Embodiments in accordance with the present invention furthermore optimize the usage of Automatic Call Distribution ("ACD") media resources while servicing chat and call sessions. Embodiments in accordance with the present invention enable escalation of a chat session to a voice and/or video call, while minimizing changes to the ACD.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein in connection with embodiments of the present invention, the term "contact" (as in "customer contact") refers to a communication from a customer or potential customer, in which a request is presented to a contact center. The request can be by way of any communication medium such as, but not limited to, a telephone call, e-mail, instant message, web chat, and the like.

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

As used herein in connection with embodiments of the present invention, the term "empower" refers to an ability by a party (e.g., a customer) to exercise rights, abilities, functions and so forth, which had been formerly and exclusively reserved for exercise by another party (e.g., a service agent).

The terms "switch," "server," "contact center server," or "contact center computer server" as used herein should be understood to include a Private Branch Exchange ("PBX"), an ACD, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

Embodiments of the present invention provide a system and method for handling a customer contact in a way that "empowers" the customer, allowing the customer to be able to take the control and take actions during the customer contact with a service agent.

Modern practice in managing customer contacts with contact centers has been evolving toward empowering customers, and businesses have responded with marketing and service initiatives involving "customer focus" or "customer empowerment," i.e., an emphasis on providing more information, functions, and choices to a customer during a customer contact session.

Between the time of initially accessing information and the time of registering a public opinion related to the vendor, the customer is ordinarily in a period of communication with the vendor's contact center. This is a critical period when the customer is evaluating whether their expectations from the information obtained ahead of a transaction matches their actual experience. The customer may then further evaluate whether their experience is of such a nature as to call for a public commentary on the quality of the customer contact, either positively or negatively.

One or more embodiments of the present invention may utilize Session Initiation Protocol (SIP) as a communication protocol. SIP is a communications protocol that is known and described in Internet Engineering Task Force (IETF) Request For Comment (RFC) 3261, the content of which is hereby incorporated by reference in its entirety. SIP is a simple protocol that facilitates peer-to-peer communication sessions. Users or any other addressable entities in a SIP framework are identified by Universal Resource Identifiers (URI). Each such Internet-style address (for example, sip: johndoe@avaya.com) maps into one or more Contacts, each of which typically represents a device or service at which the corresponding user may be reached. Examples are phones, desktop multimedia clients, instant message accounts, email accounts and so on. The SIP framework is responsible for routing a request for a peer-to-peer session addressed to a given URL to one or more appropriate contacts for that URL. The framework may utilize information about the preferences, presence and location of the user identified by the URL, to determine the most appropriate contacts. The protocol also provides mechanisms to specify the type of session that is requested as well as means to change session parameters.

Referring now to FIG. 1, which is a block diagram depicting a contact center in accordance with an embodiment of the present invention, there is provided a contact center 100. The contact center generally comprises a central server 110, a set of data stores or databases 114 containing contact or customer related information and other information that can enhance the value and efficiency of the contact, and a plurality of servers, for example, a voice mail server 126, an Interactive Voice Response unit or "IVR" 122, and other servers 124, an outbound dialer 128, a switch 130, a plurality of working agents operating packet-switched (first) telecommunication devices 134-1 to N (such as, but not limited to, computer work stations or personal computers), and/or circuit-switched (second) telecommunication devices 138-1 to M, all interconnected by a local area network LAN (or wide area network WAN) 142. The servers can be connected via optional communication lines 146 to the switch 130.

As will be appreciated, the other servers 124 can also include a scanner (which is normally not connected to the switch 130 or Web server), VoIP software, video call software, voice messaging software, an IP voice server, a fax server, a web server, an instant messaging server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The gateway 158 may comprise Avaya Inc.'s, G250™, G350™, G430™, G450™, G650™, G700™, and IG550™ Media Gateways and may be implemented as hardware such as, but not limited to, via an adjunct processor (as shown) or as a chip in the server.

The first telecommunication devices 134-1, . . . 134-N are packet-switched device, and may include, for example, IP hardphones, such as the Avaya Inc.'s, 1600™, 4600™, and 5600™ Series IP Phones™; IP softphones, such as Avaya Inc.'s, IP Softphone™; Personal Digital Assistants or PDAs; Personal Computers or PCs, laptops; packet-based H.320 video phones and/or conferencing units; packet-based voice messaging and response units; and packet-based traditional computer telephony adjuncts.

The second telecommunication devices 138-1, . . . 138-M are circuit-switched. Each of the telecommunication devices 138-1, . . . 138-M corresponds to one of a set of internal extensions, for example, Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming calls to and receive outgoing calls from these extensions in a conventional manner.

The second telecommunication devices can include, for example, wired and wireless telephones, PDAs, H.320 video phones and conferencing units, voice messaging and response units, and traditional computer telephony adjuncts. Exemplary digital telecommunication devices include Avaya Inc.'s 2400™, 5400™, and 9600™ Series phones.

It should be noted that embodiments of the present invention do not require any particular type of information transport medium between switch or server and first and second telecommunication devices, i.e., embodiments of the present invention may be implemented with any desired type of transport medium as well as combinations of different types of transport media.

The packet-switched network 162 of FIG. 1 may comprise any data and/or distributed processing network such as, but not limited to, the Internet. The network 162 typically includes proxies (not shown), registrars (not shown), and routers (not shown) for managing packet flows. The packet-switched network 162 is in (wireless or wired) communication with an external first telecommunication device 174 via a gateway 178, and the circuit-switched network 154 with an external (wired) second telecommunication device 180 and (wireless) third (customer) telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In one configuration, the server 110, network 162, and first telecommunication devices 134 are Session Initiation Protocol or SIP compatible and may include interfaces for various other protocols such as, but not limited to, the Lightweight Directory Access Protocol or LDAP, H.248, H.323, Simple Mail Transfer Protocol or SMTP, IMAP4, ISDN, E1/T1, and analog line or trunk.

It should be emphasized the configuration of the switch, server, user telecommunication devices, and other elements as shown in FIG. 1 is for purposes of illustration only and should not be construed as limiting embodiments of the present invention to any particular arrangement of elements.

In handling incoming calls, a contact center is capable of exchanging Internet Protocol (IP) data packets, Session Initiation Protocol (SIP) messages, Voice over IP (VoIP) traffic, and stream-related messages (e.g., Real Time Streaming Protocol [RTSP] messages, etc.) with calling endpoints such as endpoint 202. As those who are skilled in the art will appreciate, after reading this specification, contact center 210 is capable of communicating by using other protocols, in some alternative embodiments.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to route, and then forward the contact to a specific contact center resource such as, but not limited to, the IVR unit 122, the voice mail server 126, the instant messaging server, and/or first or second telecommunication device 134, 138 associated with a selected agent. The server 110 distributes and connects these contacts to telecommunication devices of available agents, based on the predetermined criteria noted above.

When the central server 110 forwards a voice contact to an agent, the central server 110 also forwards customer-related information from databases 114 to the agent's computer work station for viewing (such as by a pop-up display) to permit the agent to better serve the customer. The agents process the contacts sent to them by the central server 110. This embodiment is particularly suited for a Customer Relationship Management (CRM) environment in which customers are permitted to use any media to contact a business. In the CRM environment, both real-time and non-real-time contacts may be handled and distributed with equal efficiency and effectiveness. The server 110 may use a work assignment algorithm that, for example, does not use a queue. In any event, the contact may have associated or "known" contact information. This contact information may include, for example, how long the contact has been waiting, the contact's priority, the contact's media channel, the contact's business value, etc. The contact may be handled based on such known contact information.

The server and/or switch can be a software-controlled system including a processing unit (CPU), microprocessor, or other type of digital data processor executing software or an Application-Specific Integrated Circuit (ASIC) as well as various portions or combinations of such elements. The memory may comprise random access memory (RAM), a read-only memory (ROM), or combinations of these and other types of electronic memory devices. Embodiments of the present invention may be implemented as software, hardware (such as, but not limited to, a logic circuit), or a combination thereof.

The contact center 100, in one configuration, includes an automated instant messaging server as another server 124. In such an embodiment, when a customer initiates contact with the contact center 100 using instant messaging, a new instant messaging thread is initiated by the customer. As will be appreciated, instant messages are stand-alone messages, and threading (or associating instant messages with data structures associated with an instant messaging session between a customer and an agent) occurs at the application level. The association is typically effected by pairing an electronic address (e.g., IP address, Media Access Control (MAC) address, telephone number, mobile-device identifier, and the like) of the customer's communication device with an electronic address (e.g., IP address, MAC address, telephone number, mobile-device identifier, and the like) of the agent's communication device in a manner similar to that used for a voice call.

The instant messaging server can be configured to send an automated response, such as "Please wait while I connect you with an agent" and/or to send the instant message to an automated interactive response unit for data collection. The instant messaging server subsequently notifies the server 110 of the existence of a new instant messaging contact, and the server 110 decides whether a suitable (human) agent is available. If an agent is available, the server 110 instructs the instant messaging server to redirect the instant messaging conversation to that available agent's communication device 134-1 . . . N. The server 110 routes, substantially in real-time, subsequent instant messages from the agent's communication device to the customer's communication device and from the customer's communication device to the agent's communication device.

Figure 2:
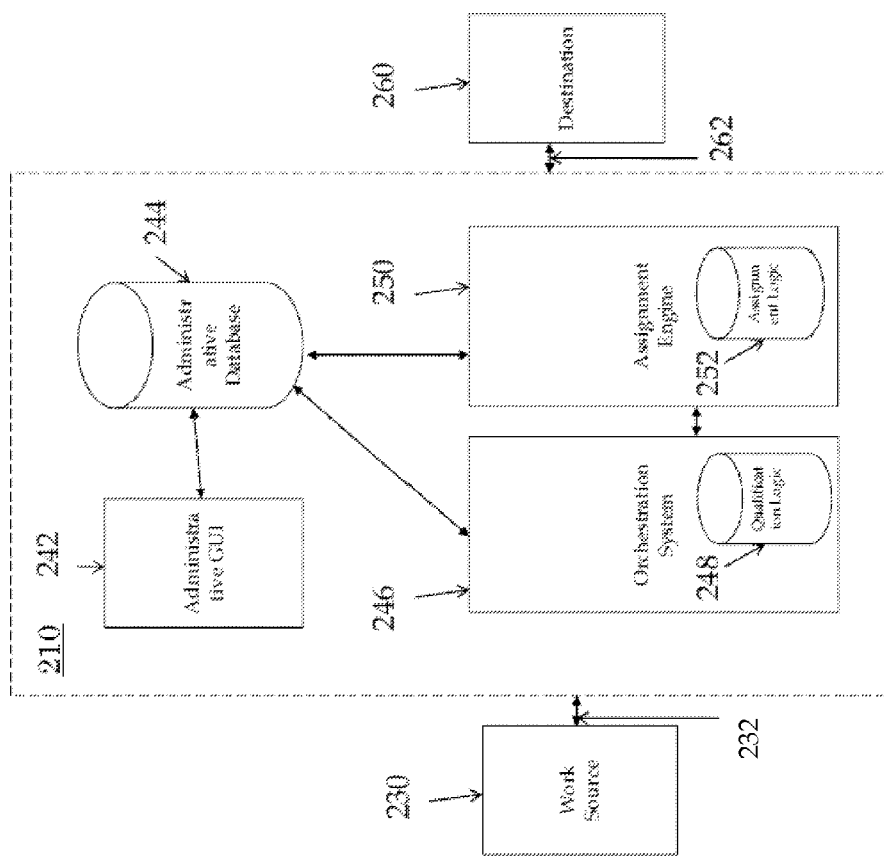
FIG. 2 is a system level block diagram depicting an administrator server in accordance with an embodiment of the present invention.

Referring to FIG. 2, which depicts a block diagram of a server 210 in accordance with an embodiment of the present invention, there is provided a server 210 in communication with a work source 230, which may comprise customer or any other entity capable of originating a transmission of work or a contact. The server 210 may be configured in communication with the work source 230 generally via a work source communication means 232, which may comprise any means of communicating data, for example, one or more trunks, phone lines, wireless connections, Bluetooth connections, digital connections, analog connection, combinations thereof, and the like.

In some embodiments of the present invention, the server 210 may also be in communication with a destination 260, which may comprise an agent or any entity capable of receiving a transmission of work or a contact. The server 210 may be configured in communication with the destination 260 generally via an agent communication means 262, which may comprise any means of communicating data, for example, a voice-and-data transmission line such as LAN and/or a circuit switched voice line, wireless connections, Bluetooth connections, digital connections, analog connections, combinations thereof, and the like. The server 210 may comprise any type of computer server, for example, a Basic Call Management System ("BCMS") and a Call Management System ("CMS") capable of segmenting work.

The server 210 can be any architecture for directing contacts to one or more telecommunication devices. Illustratively, the server may be a modified in the form of Avaya Inc.'s Definity™ Private-Branch Exchange (PBX)-based ACD system; MultiVantage™ PBX, CRM Central 2000 Server™, Communication Manager™, Business Advocate™, Call Center™, Contact Center Express™, Interaction Center™, and/or S8300™, S8400™, S8500™, and S8700™ servers; or Nortel's Business Communications Manager Intelligent Contact Center™, Contact Center—Express™, Contact Center Manager Server™, Contact Center Portfolio™, and Messaging 100/150 Basic Contact Center™.

In many embodiments, the server 210 may be a stored-program-controlled system that conventionally includes, for example, interfaces to external communication links, a communications switching fabric, service circuits (e.g., tone generators, announcement circuits, and the like), memory for storing control programs and data, and a processor (i.e., a computer) for executing the stored control programs to control the interfaces and the fabric and to provide automatic contact-distribution functionality. The server 210 generally may include a network interface card (not shown) to provide services to the serviced telecommunication devices.

The server 210 may be configured for segmenting work in the contact center and may comprise an administrative database 244 configured to store at least a common skill option and a service skill option; an administrative graphical user interface ("GUI") 242 for accessing at least the administrative database 244 and configuring the common skill option and the service skill option; an orchestration system 246 configured to receive a contact from a work source 230 and orchestrate the contact according to a qualification logic stored in a qualification logic database 248; and an assignment engine 250 configured to receive the contact, the common skill option, and the service skill option, and segment the contact according to an assignment logic stored in an assignment logic database 252. In accordance with some embodiments of the present invention, the qualification logic stored in the qualification logic database 248 and the assignment logic stored in the assignment logic database 252 may comprise any logical set of steps or sequences configured to process data at the contact center in accordance with any embodiment of the present invention.

The server and/or switch can be a software-controlled system including a processing unit (CPU), microprocessor, or other type of digital data processor executing software or an Application-Specific Integrated Circuit (ASIC) as well as various portions or combinations of such elements.

Automatic Call Distribution ("ACD") is a communication server software feature that processes incoming, outgoing, and internal calls and distributes them to groups of extensions called hunt groups or splits. The communication server also sends information about the operation of the ACD to the Call Management System ("CMS") which stores and formats the data and produces real-time and historical reports on ACD activity. ACD is used by a contact center to route incoming calls to specifically assigned splits/skills and agents. ACD allows a system administrator to create an efficient call management environment.

After receiving an instant message ("IM") chat request from a customer, embodiments in accordance with the present invention find an agent using ACD. In particular, the agent is found by use of a call/queue related mechanism, and the ACD delivers the chat session to the agent. Embodiments in accordance with the present invention can escalate the chat session to a phone/voice session with the same agent, without having to queue the session and without having to change the ACD that is currently installed.

Figure 3:
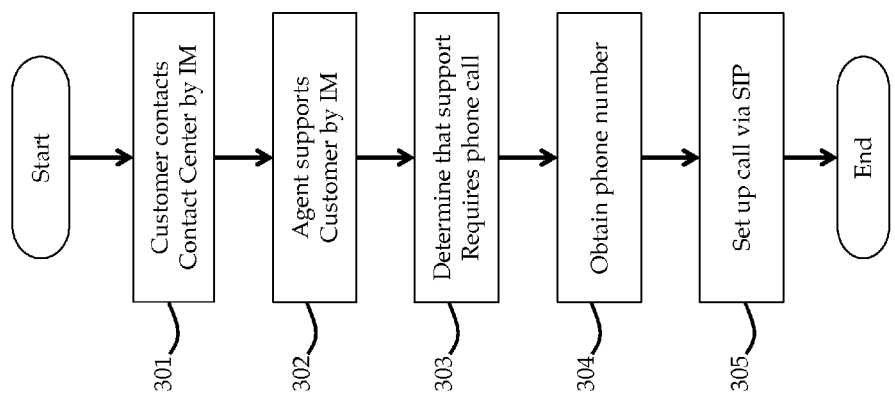
FIG. 3 illustrates at a high level of abstraction a customer support session that includes escalation of a chat session to a phone/voice session, in accordance with an embodiment of the present invention.

FIG. 3 illustrates at a high level of abstraction a customer support session 300 that includes escalation of a chat session to a phone/voice session, in accordance with an embodiment of the invention. At step 301, a customer contacts a contact center using a text-based communication such as an IM. In other embodiments in accordance with the present invention, other text-based communications usable over the Internet may be used with session 300, such as a chat window, browser, standalone application, and so forth. At step 302, after an IM communication channel is established, an agent begins to support the customer by using IM. At step 303, a decision or request is made that a phone call is needed to help resolve the problem that the customer contacted the contact center about. The decision or request may be initiated by the contact center agent or the customer. If it is the customer who has decided to receive support via a telephone call, the customer may inform the contact center agent of that decision, and then the contact center agent may initiate the request in place of the customer. At step 304 the customer supplies the phone number that will be used by the customer for the call. At step 305, the contact center agent sets up the call via a conventional protocol such as SIP, H.323, ISDN/TDM, and so forth. After the call is set up and both the customer and the contact center agent have connected, then the support continues by phone call.

Figure 4A:
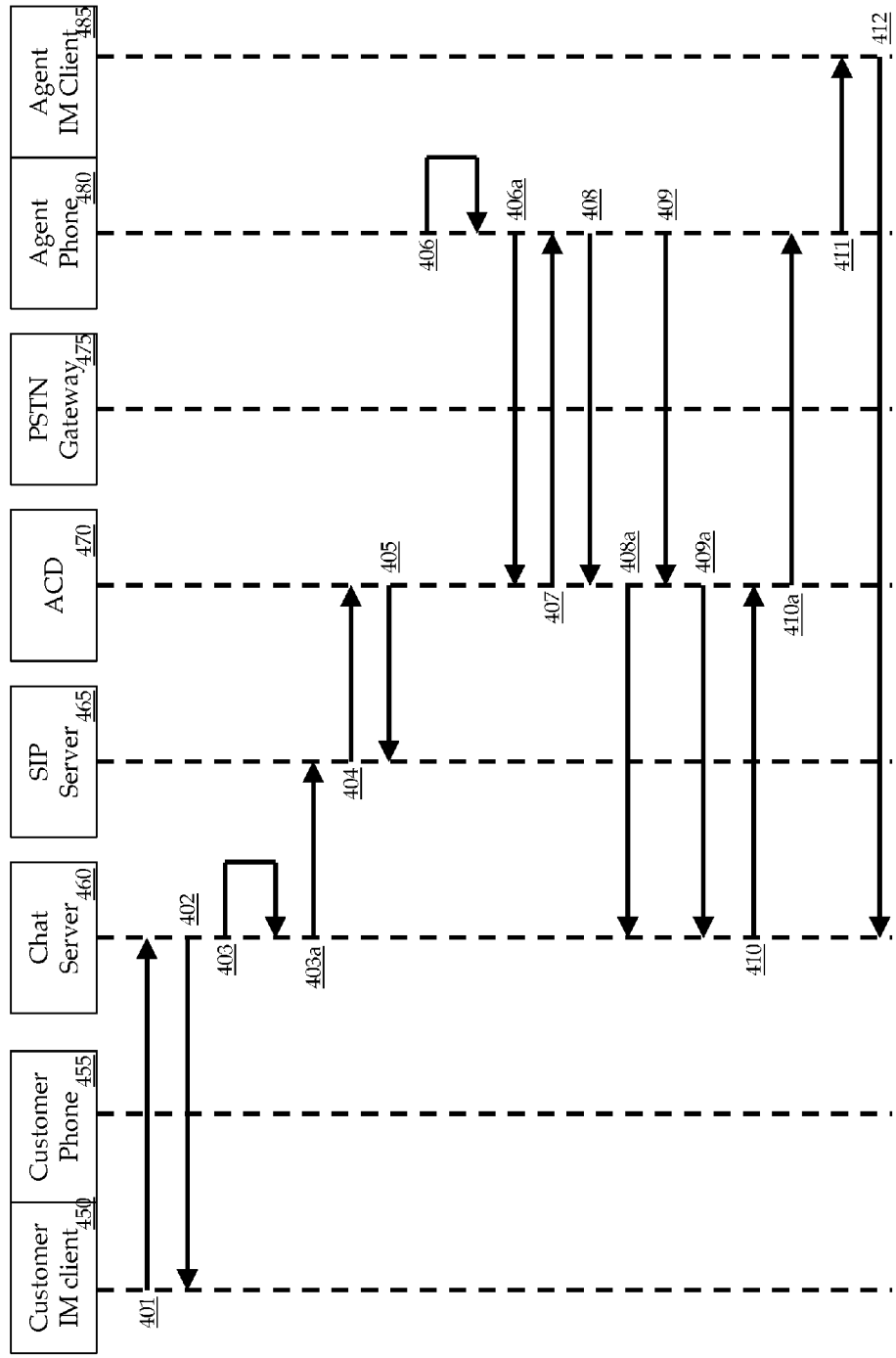
FIG. 4A illustrates typical steps taken during the customer support session, from the initiation of the customer support session to the establishment of an IM chat communication link, in accordance with an embodiment of the present invention.
Figure 4B:
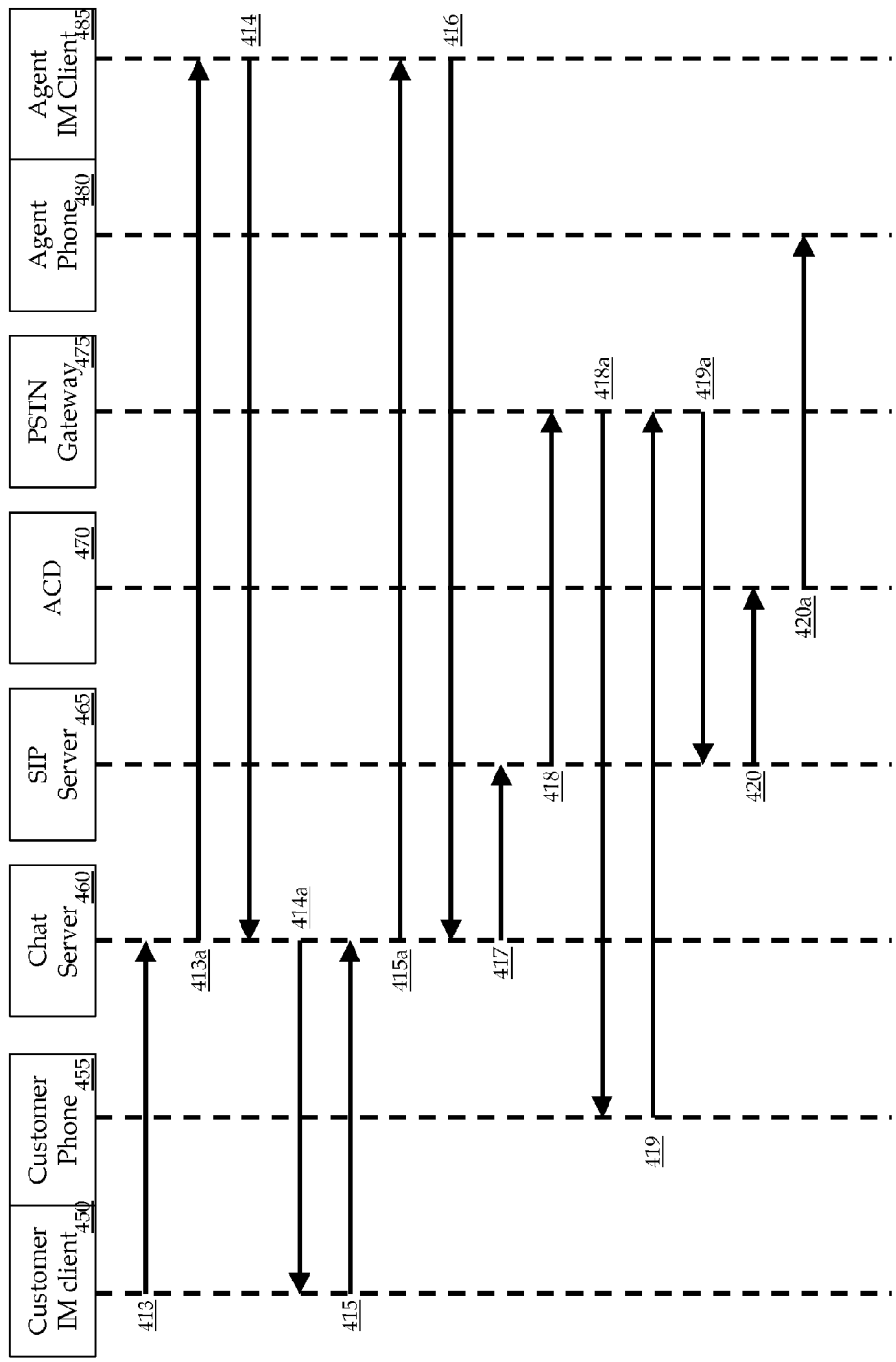
FIG. 4B illustrates typical steps taken from during the customer support session, from IM chat communication to the establishment of a telephone call between the customer and the agent, in accordance with an embodiment of the present invention.

FIGS. 4A-4B illustrate at a lower level of abstraction a customer support session that includes a method to escalate and/or to de-escalate a mode of support for a customer contact, e.g., escalating a chat session to a phone/voice session, in accordance with an embodiment of the invention. Each message exchange is identified by the reference number located near the origination end of the message exchange. Although FIGS. 4A-4B may be discussed and/or illustrated with respect to call setup using SIP, it should be understood that communication links may be established with a caller/callee who is using other signaling protocols such as H.323 or ISDN/TDM. In these cases, a signaling and/or media gateway (not shown in the figures) may be used to convert the caller/callee signaling into SIP signaling and SIP-compatible media.

FIG. 4A illustrates typical steps taken during the customer support session, from the initiation of the customer support session to the establishment of an IM chat communication link. FIG. 4B illustrates typical steps taken from during the customer support session, from IM chat communication to the establishment of a telephone call between the customer and the agent. The customer support session includes interactions among one or more of the following; a customer IM client 450, which may execute on customer computing devices such as a desktop PC, laptop PC, smart phone, tablet computer, etc.; customer phone 455, which can be substantially any phone, such as wired, wireless, VoIP phone, etc.; chat server 460; SIP server 465; ACD 470; PSTN gateway 475; agent phone 480, which can be substantially any phone, such as a wired phone, a wireless phone, a VoIP phone, a computing device with a softphone capability, etc.; and agent IM client 485, which may execute on customer computing devices such as a desktop PC, laptop PC, smart phone, tablet computer, etc.

Embodiments in accordance with the present invention are able to use a standard call manager ("CM") as ACD 470. Chat server 460 and SIP server 465 are placed in the IM and SIP call flow paths as described below.

Referring to FIG. 4A, at step 401 a customer accesses an IM client 450 (e.g., by using the customer's web browser to access a vendor's web site), and requests a chat/IM session. The IM request is sent to chat server 460.

At step 402, replies with an acknowledgement to the customer, ordinarily via a text message, e.g., "please wait while we find an agent for you".

At step 403, chat server 460 generates a session/correlation ID, and supports sending it via the User to User Information ("UUI") field of a SIP message. The contents of the UUI field are used to reference the chat session in future interactions.

At step 403a, chat server 460 requests from SIP server 465 that an agent is to be found for the chat session identified by the UUI from step 403.

At step 404, a SIP INVITE message without an SDP but including the UUI information generated at step 403 is sent from SIP Server 465 to ACD 470. SIP server 465 may use the existing mechanisms of the CM (e.g., such as those used by Avaya™ Intelligent Customer Routing ("ICR") and Call Back Assist ("CBA")) to find an available agent via a phantom call. The phantom call is implemented by queueing a call with a SIP INVITE message that has a header and an optional body. The SIP INVITE message may have either no SIP Session Description Protocol ("SDP") or no media line ("m-line") specified in the optional body of the SIP INVITE message.

The body of the SIP INVITE message, if present, carries SDP information. The SDP information may include the supported media options (i.e., codecs) in order to inform the calling end (here, the CM) what codecs the receiving end supports. If the SIP INVITE message arrives at the CM with an empty SDP body, or having an SDP body without an m-line descriptor of the SDP, then the CM will assume that the full SDP will be negotiated at a later point, and the CM will not allocate media resources for this call at this time. Media resources instead may be used to place a caller on hold, place a user in a conference call, convert codecs, etc. Therefore, because the SIP INVITE is used only to find an available agent to chat and not to talk, the SDP (or an SDP without the m-line) does not need to be sent. The CM and its resources can then be used more efficiently to find the available agent. The header of the SIP INVITE message may include the UUI.

Steps 404 through 410a refer to steps used to establish an IM session with the available agent. In particular, at step 404, a SIP INVITE message without an SDP may be sent from SIP server 465 to ACD 470. At step 405, a SIP 182-queued message may be sent from ACD 470 to SIP server 465, in order to acknowledge the request in step 404.

At step 406, a wait loop may be entered until the agent associated with agent phone 480 becomes available. The availability of the agent is communicated to ACD 470 via step 406a. At step 407, after an agent associated with agent phone 480 becomes available, a SIP INVITE (no-SDP; UUI) message may be sent from ACD 470 to agent phone 480. At step 408, a SIP 180-Ringing message may be sent from agent phone 480 to ACD 470. At step 408a, the SIP 180-ringing message may be sent from ACD 470 to chat server 460. At step 409, a SIP 200-OK (sdp-Agent) message may be sent from agent phone 480 to ACD 470 when the agent answers the phone, and then at step 409a the SIP 200-OK (sdp-Agent)

message may be sent from ACD 470 to chat server 460. At step 410, a standard SIP ACK message may be sent from chat server 460 to ACD 470, and at step 410a, a SIP ACK message may be sent from ACD 470 to agent phone 480.

At step 411, a message including the UUI may be sent from agent phone 480 to agent IM client 485 in order to trigger start of agent IM client 485. The UUI may be used as an identifier of a chat session to be opened, the UUI having been created by SIP server 465 at step 404.

At step 412, an IM joinSession message including the UUI may be sent from agent IM client 485 to chat server 460. By this message, agent IM client 485 requests that the chat server 460 allow IM client 485 to join the chat session identified by the UUI. Once IM client 482 has been so joined by the chat server, then the customer and agent can exchange text messages and/or IMs.

Referring to FIG. 4B, at steps 413 and 413a, a message may be sent from the customer to the agent, with chat server 460 acting as a back-to-back ("B2B") chat server, connecting the two sides so messages are seen by both the customer and the agent. For example, steps 413 and 413a may pertain to the customer describing the nature of the problem to the agent. Similarly at steps 414 and 414a, a message may be sent from the agent to the customer, with chat server 460 acting as a B2B chat server, and seen by both the customer and the agent. For example, steps 414 and 414a may pertain to the agent asking the customer to provide a telephone number after deciding to escalate the problem. Persons of skill in the art will recognize that this exchange of messages between the customer and agent via chat server 460 may continue indefinitely in either direction, for example the customer may use steps 415 and 415a to provide a telephone number to the agent.

At step 416, the agent may send a chat message carrying a command (e.g., "escalate2Phone"). The command may be embedded in the message portion of the communication, rather than in an overhead portion or a control portion associated with the message portion. In an embodiment in accordance with the present invention, only the agent may send the command in the chat message. Chat Server 460, as a B2B server, parses the text message, and recognizes and understands that the text message includes an embedded command and does not propagate the command to the customer. The text message may have both a command portion that is interpreted rather than propagated, and a non-command portion that is propagated. Upon recognition (i.e., interpretation) of the embedded command, chat server 460 carries out process steps described below in order to trigger SIP server 465 to begin escalation of the IM session to a phone session.

At step 417, chat server 460 sends an HTTP message to SIP server 465 in order to begin setting up a telephone call. The UUS and the customer's PSTN telephone number are passed to SIP server 465 by step 417.

Steps 418 through 420a refer to steps used to establish a SIP call (or otherwise activate a communication link) between the agent and the customer. In particular, at step 418, SIP Server 465 uses the customer's phone number to send a SIP INVITE message to PSTN gateway 475. At step 418a, PSTN gateway 475 will place a call to customer phone 455. At step 419, customer phone 455 responds by sending a status message such as "ringing" or "answer" to PSTN gateway 475. At step 419a, a SIP message 180-Ringing and/or 200-OK may be sent from PSTN gateway 475 to SIP server 465. At step 420, a SIP re-invite message may be sent from SIP server 465 to ACD 470, and at step 420a a re-invite message may be sent from ACD 470 to agent phone 480.

SIP server 465 uses the UUI to find the existing no-media/phantom call from step 404 that was used to find and/or get to the agent. It exchanges these call legs' SDP and a media/RTP path may be established between and the customer and the agent. Real-time Transport Protocol ("RTP"), also known as RFC 3550 (formerly RFC 1889), may be used for transporting real-time data and providing Quality of Service ("QoS") feedback. Note here that agent phone 480 did not ring anymore, as it has been connected all along (because of signaling, but without any media) since it rang to start the IM session. Note also that the start of the RTP path does not destroy the IM session, and both can continue from this point on.

At the conclusion of the process depicted in FIGS. 4A-4B, both an instant messaging communication channel and a voice/video communication channel are active between the customer and the service agent. It is optional whether or not the instant messaging communication channel is disconnected after establishment of the voice/video communication channel. It may facilitate a future de-escalation of the customer contact if the instant messaging communication channel remains active while the voice/video communication channel is active, so that a de-escalation would not need to reestablish the instant messaging communication channel.

Embodiments in accordance with the present invention provide several advantages compared to the background art. For example, a phantom call may be used to carry an IM session ID, rather than using the phantom call to find an agent who will handle a voice call. By this method, a voice session may not be needed in order to find an available agent, or to start using an agent, or to use the existing CM and/or ACD mechanism to find an available agent, or to establish a chat session, and so forth. By not using a voice session, system resources are saved and there is less strain on resources used by ACD 470.

In another advantage, embodiments in accordance with the present invention provide a simple method to associate sessions, by use of the UUI to display an IM client in a pop up window, which will then access an existing IM session of the client who may be waiting for assistance.

In another advantage, embodiments in accordance with the present invention may avoid a need to requeueing a call to an agent, which would otherwise risk connecting the customer to a different support agent. For example, if the call that was originally associated with the UUI to the agent does not have a media stream associated with it, embodiments in accordance with the present invention will not disconnect the call. By leaving the call connected, SIP server 465 may reshuffle a media stream into the call and reconnect the customer's phone to the agent without having to requeue the call and risking a connection to a different agent, in case an escalation from IM to phone may be required.

In another advantage, embodiments in accordance with the present invention may use chat server 460 acts as a B2B Chat Server. Chat server 460 so configured will propagate text from a customer to an agent, and vice-versa, but may also accept commands from the agent, such as: "escalate2phone", "downgrade2ChatOnly", etc.

In another advantage, embodiments in accordance with the present invention—while in a chat session—will use a reduced level of CM resources, by not including an m-line in the open INVITE session, and by not excessively using media resources.

In another advantage, embodiments in accordance with the present invention may improve usage of the media resources of the CM, in particular if a chat session does not need to be escalated to a voice/phone session, thereby not requiring usage of media resources of CM.

In another advantage, embodiments in accordance with the present invention may allow for simplified call reports by referencing the UUI. Embodiments in accordance with the present invention use the UUI during message exchanges in order to more easily cross-reference reports and messages generated by, or used in, both the chat session and the phone session.

In another advantage, embodiments in accordance with the present invention may allow for minimal impact to the existing CM design, because the chat server 460 and the SIP server 465 are added as additional servers in the CM in order to provide dedicated computing resources to chat and SIP functions.

Embodiments of the present invention include a system having one or more processing units coupled to one or more memories. The one or more memories may be configured to store software that, when executed by the one or more processing unit, allows a customer service agent to escalate the mode of support provided to a customer during customer service scenarios, at least by use of processes described above in FIGS. 3 and 4, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method to change a mode of communication used by an agent at a contact center for customer service, comprising:
receiving, from a customer, a customer contact via a first mode of communication;
establishing a first communication link, using the first mode of communication, between the customer and the agent;
communicating by use of the first mode of communication between the customer and the agent;
receiving an instruction, via an instant message, to change the mode of communication to a second mode of customer service, wherein the instruction comprises a textual command embedded in a message portion of the instant message;
suppressing display of the instruction to the customer;
interpreting, by the contact center, the instruction from the agent;
establishing a second communication link, using the second mode of communication, between the customer and the agent; and
communicating by use of the second mode of communication between the customer and the agent,
wherein:
the first mode of communication is a telephone call and the second mode of communication is instant messaging; and
the instruction to change the mode of communication is received only from the agent.

2. The method of claim 1, further comprising: providing an instant message identifier by use of a phantom call.

3. The method of claim 1, further comprising:
generating an instant message session ID by use of an instant message server in the contact center;
communicating the instant message session ID to an instant message agent associated with a terminal of the agent; and
invoking an instant message window based upon a chat session ID.

4. The method of claim 1, further comprising: disconnecting the first mode of communication upon establishment of the second mode of communication.

5. The method of claim 3, wherein the instant message session ID is used as a key for both an instant message session call report and a phone session call report.

6. The method of claim 1, further comprising: providing instant messaging services by use of a first server and communication link setup services by use of second server, wherein the second server is different than the first server.

7. The method of claim 1, wherein the first communication link and the second communication link are established by use of an H.323 protocol.

8. The method of claim 1, wherein the first communication link and the second communication link are established by use of a Session Initiation Protocol (SIP) protocol.

9. A system to change a mode of communication used by an agent at a contact center for customer service, comprising:
a first communication interface configured to receive, from a customer, a customer contact via a first mode of communication;
a first communication link, using the first mode of communication, between the customer and the agent;
a receiver configured to receive an instruction, via an instant message, to change the mode of communication to a second mode of customer service, wherein the instruction comprises a textual command embedded in a message portion of the instant message;
a suppression module configured to suppress display of the instruction to the customer;
a contact center module configured to interpret the instruction from the agent; and a second communication link, using the second mode of communication, between the customer and the agent, wherein the second communication link is activated in response to the instruction from the agent, wherein:

the first communication interface supports a telephone call and the second communication interface supports instant messaging; and the instruction to change the mode of communication is received only from the agent.

10. The system of claim 9, further comprising: a module configured to provide an instant message identifier by use of a phantom call.

11. The system of claim 9, further comprising:

a module configured to generate an instant message session ID by use of an instant message server in the contact center;

a communication interface configured to communicate the instant message session ID to an instant message agent associated with a terminal of the agent; and a module configured to invoke an instant message window based upon a chat session ID.

12. The system of claim 9, wherein the first mode of communication is disconnected upon establishment of the second mode of communication.

13. The system of claim 11, wherein the instant message session ID is used as a key for both an instant message session call report and a phone session call report.

14. The system of claim 9, further comprising:

a first server configured to provide instant messaging services; and a second server configured to provide communication link setup services, wherein the second server is different than the first server.

* * * * *